United States Patent [19]

Watson

[11] 4,076,989

[45] Feb. 28, 1978

[54] HOUSING AND STATOR ASSEMBLY FOR A DYNAMOELECTRIC MACHINE

[75] Inventor: Richard D. Watson, Chesterfield, Ind.

[73] Assignee: General Motors Corporation, Detroit, Mich.

[21] Appl. No.: 702,217

[22] Filed: Jul. 2, 1976

[51] Int. Cl.² .............................................. H02K 5/00
[52] U.S. Cl. ...................................... 310/89; 310/42; 310/258
[58] Field of Search .................. 310/89, 254, 42, 258, 310/263, 257, 90, 259; 220/301, 302, 293

[56] References Cited

U.S. PATENT DOCUMENTS

| 1,596,367 | 8/1926 | Miller | 220/293 |
|---|---|---|---|
| 3,230,404 | 1/1966 | Graham | 310/263 |
| 3,305,740 | 2/1967 | Shano | 310/263 |
| 3,492,517 | 1/1970 | Kuraisi | 310/89 |
| 3,567,973 | 3/1971 | Masrrodonato | 310/42 |
| 3,666,978 | 5/1972 | Renner | 310/89 |
| 3,732,616 | 5/1973 | Mastrodonato | 310/42 |

FOREIGN PATENT DOCUMENTS

| 1,188,749 | 9/1959 | France | 310/263 |
|---|---|---|---|
| 1,401,243 | 7/1975 | United Kingdom | 310/263 |
| 1,149,856 | 4/1969 | United Kingdom | 310/263 |

*Primary Examiner*—R. Skudy
*Attorney, Agent, or Firm*—Robert M. Sigler

[57] ABSTRACT

A cylindrical case for a dynamoelectric machine has an open axial end and an inner axial stop surface inside said end. A stator assembly has peripheral ears abutting the inner axial stop surface and a guide ear projecting radially into an axial guide channel in the case extending from the open end to the inner axial stop surface. An end cap has a plurality of tabs extending radially into a circumferential groove in said case adjacent the axial stop surface, the tabs being wedged against ramps on the peripheral ears of the stator assembly. The cylindrical case is provided with a plurality of axial tab guide channels from the open end to the circumferential groove so that the end cap can be inserted in the case axially from the open end to the circumferential groove and twisted until the tabs engage the ramps.

3 Claims, 6 Drawing Figures

HOUSING AND STATOR ASSEMBLY FOR A DYNAMOELECTRIC MACHINE

SUMMARY OF THE INVENTION

This invention relates to dynamoelectric machines and particularly to such machines adapted for fast, easy assembly and disassembly. This invention relates further to a dynamoelectric machine in which no nuts, bolts or screws are needed to retain the stator in position within the case and to retain the end cap onto the main cylindrical body of the case. The elimination of such nuts, bolts or screws makes assembly or disassembly of such a machine a less exacting task and saves a significant amount of assembly time in mass production.

This invention provides a cylindrical case with an open axial end and an inner axial stop surface for positioning the stator. The stator is provided with Peripheral means to engage the inner axial stop surface and with ramps on the peripheral means for engagement with tabs on an end cap. A circumferential groove is provided in the cylindrical case adjacent the inner axial stop surface so that the end cap can be twisted until the tabs are wedged therein against the ramps. Appropriate axial channels are provided in the cylindrical case for a single radial stator ear and for the tabs of the end cap so that the stator and end cap can be axially inserted in the open end of the cylindrical case with the proper rotational orientation.

Further details and advantages of this invention will be apparent from the accompanying drawings and the following description of a preferred embodiment.

DESCRIPTION OF THE PREFERRED EMBODIMENT

Figure 1:
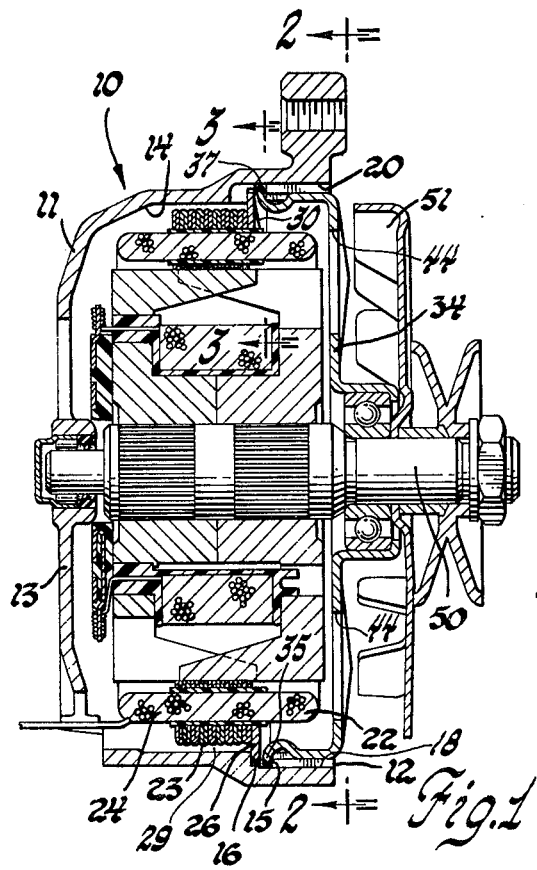
FIG. 1 shows a view along lines 1—1 in FIG. 2 of a dynamoelectric machine according to this invention with case and end cap rotated to allow axial separation.
Figure 4:
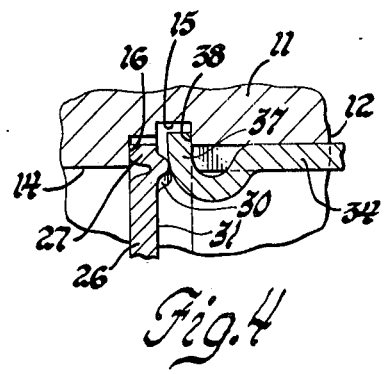
FIG. 4 shows a view along lines 4—4 in FIG. 3 showing dashed lines of FIG. 3 as solid in FIG. 4.

Referring to FIG. 1, the dynamoelectric machine 10 has a housing comprising a generally cylindrical case 11 with an open axial end 12. As shown in FIGS. 1 and 4, case 11 has an inner surface 14 which is provided, near open end 12, with a circumferential groove 15 and an inner axial stop surface 16. Circumferential groove 15 is located adjacent axial stop surface 16 and between that surface and the open end 12. In this embodiment circumferential groove 15 is axially separated from axial stop surface 16 for reasons that will be apparent at a later point in this description.

Figure 2:
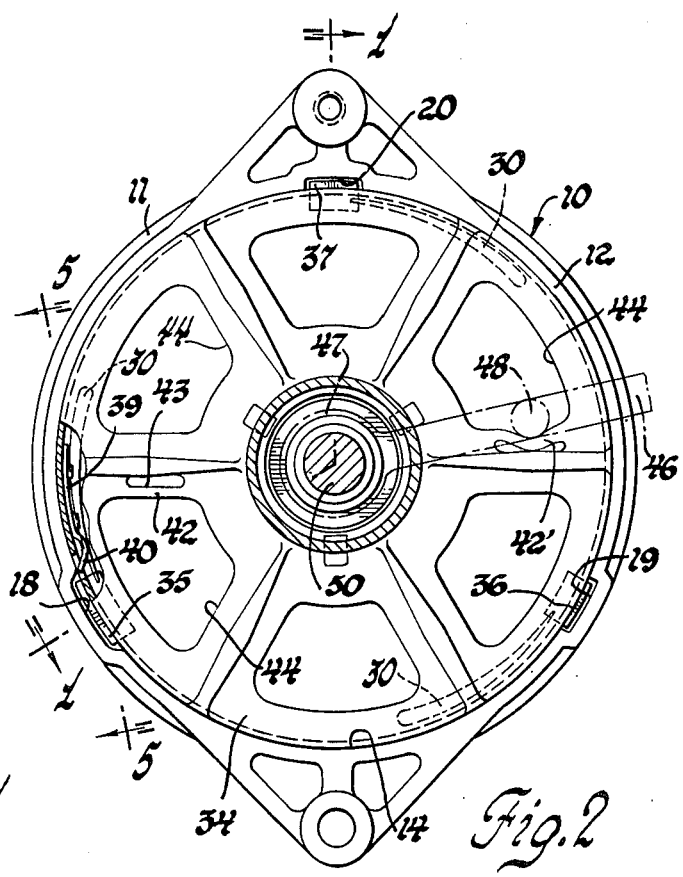
FIG. 2 shows a view along line 2—2 in FIG. 1.

Referring to FIGS. 1 and 2, it can be seen that case 11 is provided with a plurality of axial grooves, in this embodiment numbered 18, 19 and 20, which extend axially inward from open end 12. All the grooves 18, 19 and 20 must extend inward as far as circumferential groove 15, while one of the grooves, groove 20, must extend farther to axial stop surface 16. It is apparent from FIG. 2 that groove 18 is wider than either of the other grooves 19 or 20.

Figure 3:
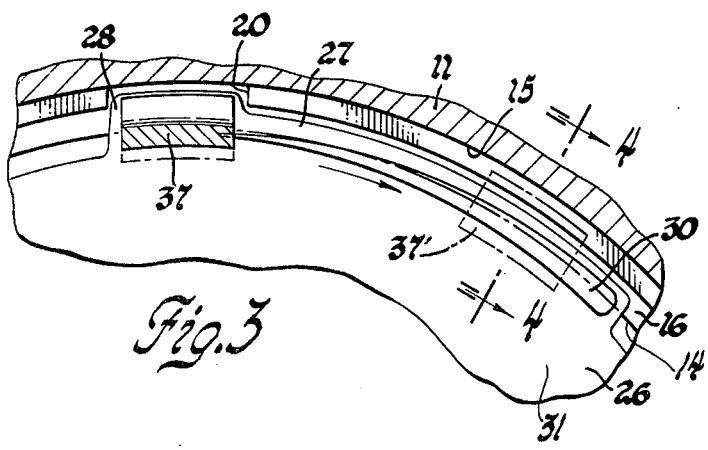
FIG. 3 shows a view along line 3—3 in FIG. 1.
Figure 6:
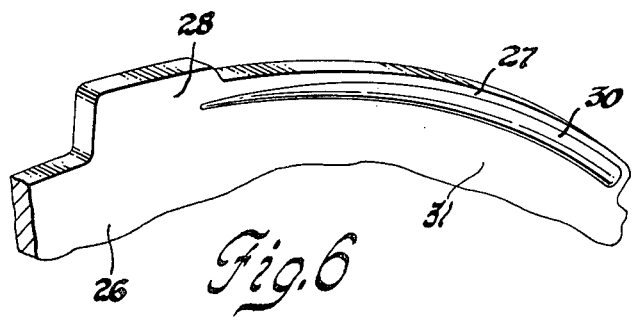
FIG. 6 shows a perspective view of a portion of the stator assembly for use in this invention.

Stator assembly 22, as shown in FIG. 1, comprises a laminated core 23 of conventional material on which is disposed a stator winding 24. Core 23 includes a special end lamina 26 which includes, as shown in FIGS. 3 and 6, peripheral mounting means 27 projecting radially beyond the remainder of core 23 and in axial abutment with axial stop surface 16, as shown in FIGS. 1 and 4. The peripheral mounting means 27, in this embodiment, comprise ears which are circumferentially separated to define openings 29 between core 23 and the inner surface 14 of case 11. These openings 29 provide for cooling air flow therethrough in response to a conventional cooling fan 51 mounted on an armature shaft 50. The additional air flow area of openings 29 helps improve the cooling of the windings 24 and such electronic elements, not shown, as may be mounted on the axial end 13 of case 11 opposite open end 12.

The peripheral mounting means 27 include an ear 28 projecting outward into channel 20 as shown in FIGS. 2 and 3. Since channel 20 is the only one of the axial channels that extends all the way to the axial stop surface 16, end lamina 26 can abut flatly against axial stop surface 16 only if ear 28 is in channel 20. Channel 20 allows the stator assembly 22 to be inserted within cylindrical case 11 from open end 12 thereof only in a predetermined rotational orientation.

Peripheral mounting means 27 of end lamina 26 are provided, by stamping or other means, with a plurality of ramps 30 in the otherwise flat axial surface 31 of end lamina 26 facing open end 12 of cylindrical case 11. Each ramp 30 begins flush with axial surface 31 adjacent one of the channels 18, 19 and 20 and proceeds circumferentially across axial surface 31, while rising at a shallow angle therefrom. In this embodiment, the number of such ramps is three, one for each of the aforementioned channels.

An end cap 34 is provided to close the open axial end 12 of cylindrical case 11. End cap 34 is stamped from sheet metal into an appropriate shape which includes a plurality of tabs 35, 36 and 37, which tabs project radially outward from its circumference into circumferential groove 15, where they are wedged between the ramps 30 and the opposite wall 38 of circumferential groove 15, which opposite wall 38 forms an axial stop means facing axial stop means 16. The tabs 35, 36 and 37 are adapted to slide axially through the channels 18, 19 and 20, respectively, as the end cap is assembled to the open end 12 of cylindrical case 11. Tab 35 is slightly wider than either of tabs 36 or 37, as seen in FIG. 2, so that it can be inserted only through channel 18; this provides rotational orientation for the end cap 34. During assembly, end cap 34 is first advanced axially into open ends 12 of cylindrical case 11 with tabs 35, 36 and 37 in the appropriate channels 18, 19 and 20 until tabs 35, 36 and 37 abut axial surface 31 of end lamina 26. End cap 34 is then rotated, clockwise in FIGS. 2 and 3; and tabs 35, 36 and 37 ride up ramps 30 until they become wedged between ramps 30 and opposite wall 38 of circumferential groove 15. FIG. 2 and the solid line tab 37 of FIG. 3 show the position of end cap 34 with tab 37 still aligned with channel 20. The dashed line tab 37' of FIG. 3 shows a typical end position for tab 37 after rotation of end cap 34.

Figure 5:
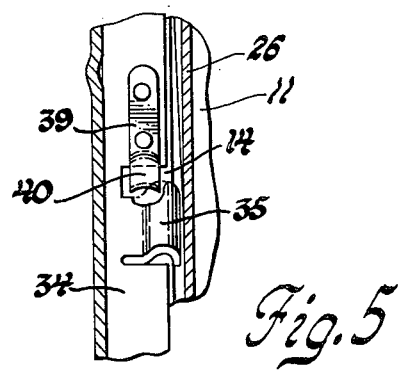
FIG. 5 shows a view along line 5—5 in FIG. 2.

As seen in FIGS. 2 and 5, a frictional blocking device comprises a metallic strip 39 riveted to end cap 34 and having an end 40 projecting circumferentially in a direction opposite the closing rotational direction of end cap 34 and slanting outward at an angle to engage the inner surface 14 of open axial end 12 of cylindrical case 11 with a radial outward bias. Free end 40 slides easily along inner surface 14 as end cap 34 is rotated to its closed position; however, its sharp edges engage inner surface 14 to prevent counterrotation of end cap 34 and consequent loosening of the assembly. Free end 40, however, can be pried away from inner surface 14 with a screwdriver or similar tool for the removal of end cap 34, if desired.

FIG. 2 shows a means and method by which the proper closing torque can be applied to end cap 34 in the assembly of dynamoelectric machine 10. Openings or slots provide at least one comparatively narrow ridge 42 of sheet metal at an appropriate radius from the axial center of end cap 34. In this embodiment, for example, bridge 42 can be formed by an appropriate slot 43 adjacent one of a plurality of openings 44 provided through end cap 34 for cooling air circulation. The width of bridge 42 in the circumferential direction is selected, with regard to the thickness of the sheet metal of end cap 34 and the radial distance of bridge 42 from the axis of end cap 34, so that bridge 42 will deform when subjected to a preselected force applied to the bridge 42 to rotate end cap 34 in the closing direction. The force is selected to be somewhat greater than that produced by the desired closing torque for end cap 34. Such force may be applied, for example, with a torque device 46 as shown in the dashed lines in FIG. 2. One end 47 of torque device 46 is anchored rotatably by being slipped over armature shaft 50. At the proper radius, a pin 48 projects from torque device 46 into opening 44 to apply force to bridge 42. When bridge 42 has been deformed to resemble bridge 42' in FIG. 2, both the assembler and anyone else dealing the assembly will be assured tht sufficient closing torque has been applied to end cap 34.

The preceding description is that of a preferred embodiment, but equivalent embodiments will occur to those skilled in the art. These equivalent embodiments are included within the scope of the invention, which should be limited only by the following claims.

The embodiments of the invention in which an exclusive property or privilege is claimed are defined as follows:

1. A housing and stator assembly for an easily assembled and disassembled dynamoelectric machine comprising, in combination:

a generally cylindrical case having an open axial end, the case having an inner surface defining first axial stop means adjacent and facing the open axial end and second axial stop means between the first axial stop means and the open axial end and facing the first axial stop means;

a stator in the cylindrical case, the stator having peripheral mounting means axially abutting the first axial stop means and one or more circumferentially extending, axially rising ramps facing the second axial stop means, the stator being adapted for insertion into the cylindrical case through the open axial end into abutment with the first axial stop means; and an end cap for the cylindrical case, the end cap having one or more tabs wedged between the ramps and the second axial stop means to lock the end cap in the open end of the cylindrical case and the stator assembly within the cylindrical case, the end cap being adapted for axial insertion into the open end past the second axial stop means and subsequent rotation with the tabs moving circumferentially between the ramps and the second axial stop means into locking engagement therebetween.

2. A housing and stator assembly for a dynamoelectric machine providing fast, easy assembly and disassembly thereof and comprising:

a cylindrical case having an open axial end and defining an inner surface, the inner surface defining, near the open axial end, axial stop means facing the open end, a circumferential groove between the axial stop means and the open axial end and a plurality of channels extending axially inwardly from the open axial end, the plurality of channels including a stator ear channel extending to the axial stop means and one or more end cap tab channels extending to the circumferential groove;

a stator in the cylindrical case, the stator having peripheral mounting means axially engaged with the axial stop means and including an ear projecting radially into the stator ear channel to circumferentially position the stator within the case, the peripheral mounting means further including a plurality of circumferentially extending ramps, each ramp beginning adjacent a channel and rising axially toward the open end of the case, the stator being adapted for insertion and removal through the open end of the case with the ear traversing the stator ear channel; and an end cap having a plurality of tabs extending into the circumferential groove and being wedge firmly therein against the ramps, the number of the tabs being not greater than the number of channels in the cylindrical case, the end cap being adapted for insertion and removal through the open end of the cylindrical case with the tabs axially traversing the channels and being further adapted for rotation with the tabs in the circumferential groove between a loose position in which the tabs are aligned with the channels for axial movement therethrough and an assembled position in which the tabs are wedged firmly against the ramps to hold the end cap and stator firmly to the cylindrical case.

3. The housing and stator assembly of claim 2 in which one of the tabs is wider than all but one of the channels, whereby the end cap is circumferentially positioned within the case.

* * * * *